US010390127B2

(12) United States Patent
Yang et al.

(10) Patent No.: US 10,390,127 B2
(45) Date of Patent: Aug. 20, 2019

(54) WEARABLE DISPLAY EQUIPMENT

(71) Applicant: SHENZHEN ROYOLE TECHNOLOGIES CO. LTD., Shenzhen (CN)

(72) Inventors: Songling Yang, Shenzhen (CN); Chao Jiang, Shenzhen (CN); Songya Chen, Shenzhen (CN); Linwei Yu, Shenzhen (CN); Fan Yang, Shenzhen (CN); Xinyuan Xia, Shenzhen (CN)

(73) Assignee: SHENZHEN ROYOLE TECHNOLOGIES CO. LTD., Nanshan District, Shenzhen, Guangdong (CN)

( * ) Notice: Subject to any disclaimer, the term of this patent is extended or adjusted under 35 U.S.C. 154(b) by 578 days.

(21) Appl. No.: 15/056,930

(22) Filed: Feb. 29, 2016

(65) Prior Publication Data
US 2017/0055061 A1 Feb. 23, 2017

Related U.S. Application Data

(63) Continuation of application No. PCT/CN2015/087565, filed on Aug. 19, 2015.

(51) Int. Cl.
H04R 1/10 (2006.01)
G02B 27/01 (2006.01)
H04R 5/033 (2006.01)

(52) U.S. Cl.
CPC ....... H04R 1/1066 (2013.01); G02B 27/0176 (2013.01); G02B 2027/0169 (2013.01); H04R 1/1008 (2013.01); H04R 5/0335 (2013.01)

(58) Field of Classification Search
CPC .. H04R 1/1066; H04R 5/0035; H04R 1/1008; G02B 27/0176; G02B 2027/0169
See application file for complete search history.

(56) References Cited

U.S. PATENT DOCUMENTS 5,003,300 A 3/1991 Wells
5,321,416 A 6/1994 Bassett et al.
(Continued)

FOREIGN PATENT DOCUMENTS

CN 2525546 Y 12/2002
CN 2819243 Y 9/2006
(Continued)

OTHER PUBLICATIONS

Yang, Notice of Allowance, U.S. Appl. No. 15/057,877, dated May 17, 2018, 7 pgs.
(Continued)

Primary Examiner — Andrew Sasinowski
(74) Attorney, Agent, or Firm — Morgan, Lewis & Bockius LLP

(57) ABSTRACT

The present invention provides a wearable display equipment, comprising a headphone device including two headphone bodies, a display device including a housing and an optical display module within the housing, the housing including two end regions respectively adjacent to the two headphone bodies, a middle region between the two end regions, and a connecting portion disposed in the middle region, and a connecting component including a main body and two distal ends respectively extending from two opposite sides of the main body, the two distal ends respectively connected to the two headphone bodies, and the main body at least partially connected to the connecting portion. The display device is connected to the headphone device via the connecting component such that, when a user pushes the two headphone bodies away from each other, the two end regions of the display device are detached from the connecting component.

16 Claims, 2 Drawing Sheets

(56) References Cited

U.S. PATENT DOCUMENTS

| | | | |
|---|---|---|---|
| 5,737,012 | A | 4/1998 | Tabata et al. |
| 5,903,395 | A * | 5/1999 | Rallison ............ G02B 27/0172 345/8 |
| 6,369,952 | B1 | 4/2002 | Rallison |
| 6,421,031 | B1 | 7/2002 | Ronzani |
| 6,424,321 | B1 | 7/2002 | Ronzani et al. |
| 8,577,427 | B2 | 11/2013 | Serota |
| 2002/0005819 | A1 | 1/2002 | Ronzani et al. |
| 2002/0094094 | A1 | 7/2002 | Shin |
| 2002/0163486 | A1 | 11/2002 | Ronzani et al. |
| 2004/0201695 | A1 | 10/2004 | Inasaka |
| 2006/0062417 | A1 | 3/2006 | Tachikawa |
| 2006/0072206 | A1 | 4/2006 | Tsuyuki |
| 2007/0256107 | A1 | 11/2007 | Anderson, Jr. et al. |
| 2009/0115687 | A1 * | 5/2009 | Chiaki ............... G02B 27/0176 345/8 |
| 2011/0273365 | A1 | 11/2011 | West et al. |
| 2012/0069448 | A1 | 3/2012 | Sugihara |
| 2012/0098971 | A1 | 4/2012 | Hansen et al. |
| 2012/0162764 | A1 | 6/2012 | Shimizu |
| 2012/0244813 | A1 | 9/2012 | Liao |
| 2013/0195308 | A1 * | 8/2013 | Tankersley ............ A61F 11/06 381/378 |
| 2014/0078333 | A1 | 3/2014 | Miao |
| 2014/0133670 | A1 | 5/2014 | Lee et al. |
| 2014/0272915 | A1 | 9/2014 | Higashino et al. |
| 2014/0320972 | A1 | 10/2014 | Magyari et al. |
| 2014/0364208 | A1 | 12/2014 | Perry |
| 2014/0364209 | A1 | 12/2014 | Perry |
| 2015/0016654 | A1 | 1/2015 | Serota |
| 2015/0103606 | A1 | 4/2015 | Seong |
| 2016/0005231 | A1 | 1/2016 | Yamaga |
| 2016/0018659 | A1 | 1/2016 | Miyagawa |
| 2016/0044981 | A1 | 2/2016 | Frank et al. |
| 2016/0249124 | A1 * | 8/2016 | Drinkwater ............ H04R 1/105 |
| 2016/0349519 | A1 | 12/2016 | Yang |
| 2016/0366502 | A1 | 12/2016 | Morris et al. |
| 2017/0052378 | A1 | 2/2017 | Yang |
| 2017/0055061 | A1 | 2/2017 | Yang |
| 2017/0055079 | A1 | 2/2017 | Yang |
| 2017/0075121 | A1 | 3/2017 | Chen |
| 2017/0090201 | A1 | 3/2017 | Guo |

FOREIGN PATENT DOCUMENTS

| | | |
|---|---|---|
| CN | 2938154 Y | 8/2007 |
| CN | 101336008 A | 12/2008 |
| CN | 201336696 Y | 10/2009 |
| CN | 102387442 A | 3/2012 |
| CN | 202455514 U | 9/2012 |
| CN | 102918443 A | 2/2013 |
| CN | 103149690 A | 6/2013 |
| CN | 103581779 A | 2/2014 |
| CN | 103596099 A | 2/2014 |
| CN | 103702257 A | 4/2014 |
| CN | 203747962 U | 7/2014 |
| CN | 104166239 A | 11/2014 |
| CN | 104254037 A | 12/2014 |
| CN | 204180248 U | 2/2015 |
| CN | 204229050 U | 3/2015 |
| CN | 104503083 A | 4/2015 |
| CN | 104503086 A | 4/2015 |
| CN | 104503584 A | 4/2015 |
| CN | 104503585 A | 4/2015 |
| CN | 204302573 U | 4/2015 |
| CN | 104635340 A | 5/2015 |
| CN | 104765149 A | 7/2015 |
| CN | 104793338 A | 7/2015 |
| CN | 204575970 U | 8/2015 |
| CN | 204666953 U | 9/2015 |
| JP | 2007243631 A | 9/2007 |
| JP | 2010145859 A | 7/2010 |
| WO | WO2007119351 A1 | 10/2007 |

OTHER PUBLICATIONS

Yang, Notice of Allowance, U.S. Appl. No. 15/058,913, dated May 17, 2018, 7 pgs.
Chen, Office Action, U.S. Appl. No. 15/059,111, dated May 18, 2017, 11 pgs.
Chen, Notice of Allowance, U.S. Appl. No. 15/059,111, dated Sep. 7, 2017, 7 pgs.
Guo, Office Action, U.S. Appl. No. 15/059,119, dated Aug. 24, 2017, 9 pgs.
Guo, Final Office Action, U.S. Appl. No. 15/059,119, dated Dec. 28, 2017, 12 pgs.
Guo, Notice of Allowance, U.S. Appl. No. 15/059,119, dated Mar. 19, 2018, 7 pgs.
International Search Report and Written Opinion, PCTCN2015080363, dated Feb 3, 2016, 9 pgs.
International Search Report and Written Opinion, PCT/CN2015/087565, dated May 23, 2016, 9 pgs.
International Search Report and Written Opinion, PCT/CN2015/087566, dated Jan. 13, 2016, 9 pgs.
International Search Report and Written Opinion, PCT/CN2015/087564, dated May 10, 2016, 9 pgs.
International Search Report and Written Opinion, PCT/CN2015/087568, dated Jan. 13, 2016, 12 pgs.
International Search Report and Written Opinion, PCT/CN2015/089564, dated May 27, 2016, 7 pgs.
Royole Technologies Co. Ltd., International Search Report and Written Opinion, PCT/CN2015/090860, Jul. 21, 2016, 11 pgs.
Yang, Office Action, U.S. Appl. No. 15/057,877, dated May 8, 2017, 11 pgs.
Yang, Final Office Action, U.S. Appl. No. 15/057,877, dated Nov. 3, 2017, 13 pgs.
Yang, Office Action, U.S. Appl. No. 15/058,913, dated May 8, 2017, 13 pgs.
Yang, Final Office Action, U.S. Appl. No. 15/058,913, dated Nov. 3, 2017, 15 pgs.
Yang, Office Action, U.S. Appl. No. 15/059,104, dated Apr. 21, 2017, 10 pgs.
Yang, Notice of Allowance, U.S. Appl. No. 15/059,104, dated Sep. 26, 2017, 8 pgs.
Yang, Office Action, U.S. Appl. No. 15/056,851, dated Sep. 25, 2017, 7 pgs.
Yang, Final Office Action, U.S. Appl. No. 15/056,851, dated Dec. 26, 2017, 9 pgs.
Yang, Notice of Allowance, U.S. Appl. No. 15/056,851, dated Apr. 6, 2018, 7 pgs.

* cited by examiner

WEARABLE DISPLAY EQUIPMENT

RELATED APPLICATION

This application is a continuation application of PCT Patent Application No. PCT/CN2015/087565, entitled "WEARABLE DISPLAY EQUIPMENT" filed on Aug. 19, 2015, which is incorporated by reference in its entirety.

TECHNICAL FIELD

The disclosure relates to wearable equipment technology field, and particularly relates to a wearable display equipment.

BACKGROUND

Wearable display device, is also known as head mount display device, video glasses, glasses type display, portable cinema, it realizes playing the multimedia files, including 3D videos and so on, it takes advantage of near-eye technology to achieve the effect of an immersive cinema, and makes the concept of portable home theatre productized.

In prior art, the wearable display equipment, particular to the immersive wearable display equipment, the display device is integrally connected to the headphone device. But different users have different width of face, so it needs to provide deformation space along axis through the left and right headphone bodies. However, the shape of the main portion of the display device housing the necessary components is steady, and the deformation cannot be provided. Moreover, the main portion of the display device needs to cover two eyes of the user, so its' lateral (a direction along axis through the left and right headphone bodies) length is basically close to a distance between the two headphone bodies of the headphone device, and the connecting portions are relatively limited, the lateral deformation provided is relatively limited, when a separating force exerting on the two headphone bodies is quite great, the two connecting portions respectively connected to the two ends of the main portion of the display device would exert an expanded, twisting force on the display device, and the force would produce some damage.

According to the description above-mentioned, the application provides a wearable display equipment to solve the above technological problems.

SUMMARY

The purpose of the present invention provides a wearable display equipment to solve the problems in the above present technology.

The present invention provides a wearable display equipment, including a headphone device including two headphone bodies, a display device including a housing and an optical display module within the housing, the housing including two end regions respectively adjacent to the two headphone bodies, the middle region between the two end regions, and a connecting portion disposed in the middle region, and a connecting component including a main body and two distal ends respectively extending from two opposite sides of the main body, the two distal ends respectively connected to the two headphone bodies, and the main body at least partially connected to the connecting portion.

The present invention further provides a wearable display equipment, including two headphone bodies defining an axis direction through the two headphone bodies, an elastic connecting component connected to the two headphone bodies, the connecting component configured for making the two headphone bodies approach or depart from each other, and a display device fixedly attached to the connecting component for projecting image in a direction pointing at the two headphone bodies, wherein two ends of the display device near the two headphone bodies are both separated from the connecting component along the axis direction.

The embodiment of the present invention provides a wearable display equipment, the display device is connected to the headphone device via the connecting component, and the connecting portion of the display device is located at the middle region of the housing, when a user wears the wearable display equipment and exerts force to separate the two headphone bodies from each other, the two end regions of the display device are not connected to the connecting component, thus, the portions of the connecting component corresponding to the two end regions resolve the force acting on the display device by separating the headphone bodies.

In view of this, it needs to provide a wearable display equipment to solve the above technological problems.

DETAILED DESCRIPTION

In order to more clearly present purpose, technology program and advantages of the present invention, the following combining a plurality of embodiments and the drawings further illustrates the present invention. It should be understood that, the following described specific implementation ways are only used for explaining the present invention, not limiting the present invention.

In the description of the present invention, it should be stated that, the terms "first" and "second" are only used for description purpose that cannot be interpreted as instructions or suggests of the relative importance or implied point the number of the indicated technical characteristics. Thus, the characteristics having the "first" and "second" can express or be implied to include one or more described characteristics. In the description of the invention, the meaning of "a plurality of" is two or more than two, unless it has additionally express and specific limitations.

In the description of the invention, it should be understood that, unless it has additionally express and specific definitions and limitations, the terms of "mount", "connect" and "couple" each should have a general understanding. For example, it can be a fixed connection, also can be a detachable connection, or an integral connection; it can be connected directly, also can be connected indirectly through intermediaries, it can be communication of two internal components or interaction relations of two components. For the ordinary skilled person in the art, the specific meaning in the invention of the aforesaid terms can understand according to the concrete situation.

The following disclosure provides many different embodiments or examples to achieve the different structures of the present invention. For simplifying the disclosure of the present invention, the components and settings of the particular example are described below. Certainly, they are only examples, and the purpose is not limiting the present invention. Additionally, the present invention may repeat reference numbers and/or reference letters in different examples, the purpose of the repetition is for simplifying and clearing, itself does not instruct the relationships between all kinds of the embodiments and or the settings. Additionally, the present invention provides examples for various particular processes and materials, but the ordinary skilled person in the art can realize the application of the other processes and/or the use of the other materials.

Figure 1:
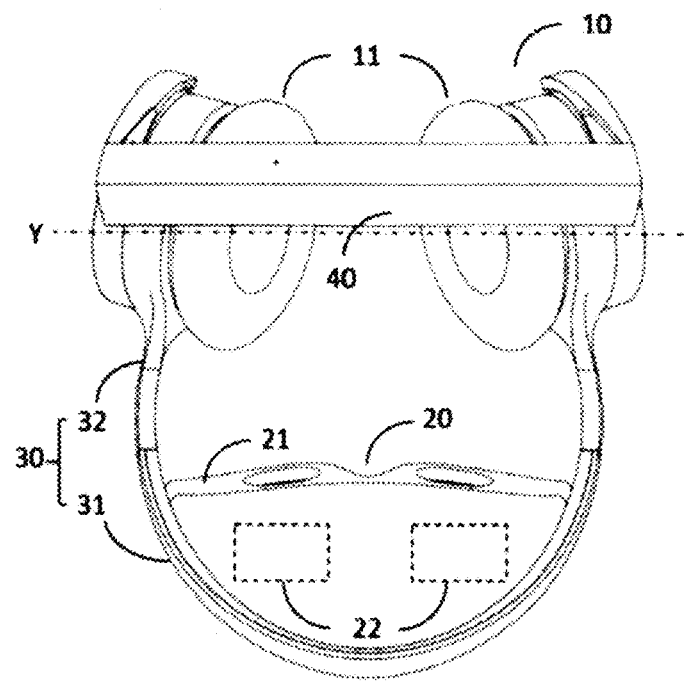
FIG. 1 is atop, block diagram view of a wearable display equipment in accordance with the embodiment of the present invention.
Figure 3:
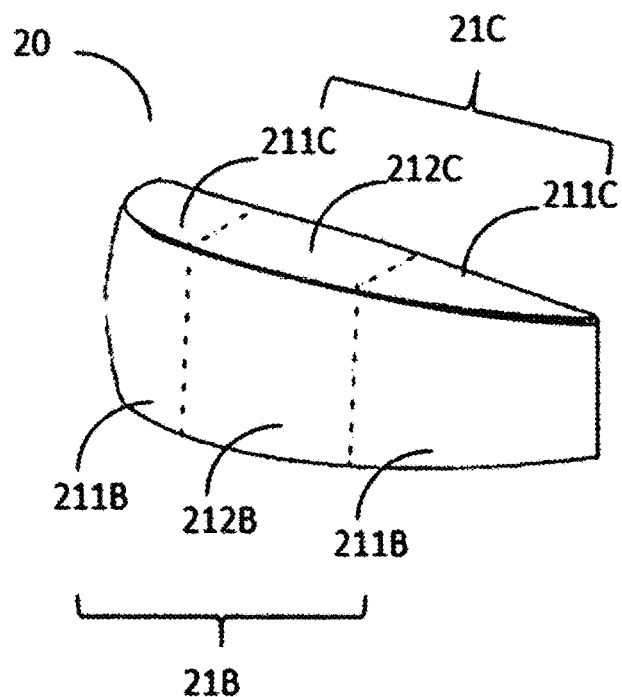
FIG. 3 is a block diagram view of a display device in FIG. 1.
Figure 4:
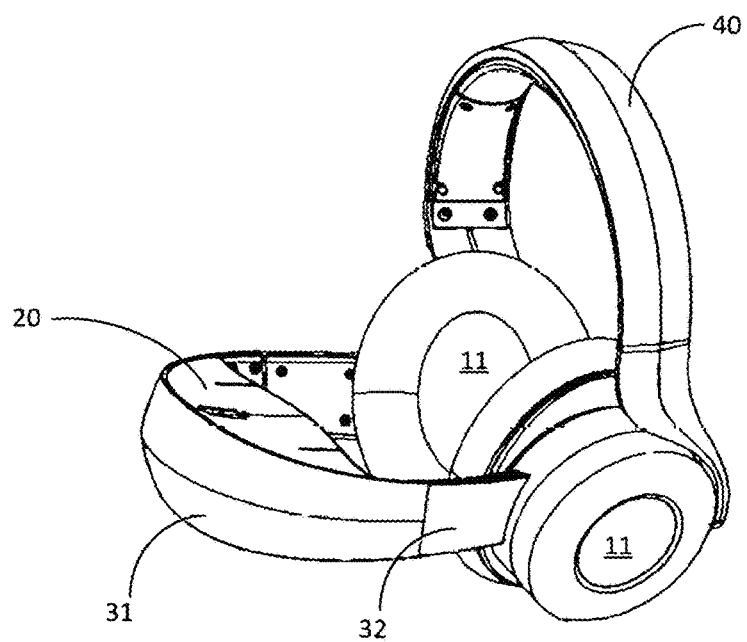
FIG. 4 is a perspective view of the wearable display equipment shown in FIG. 1.

Referring to FIG. 1 though FIG. 3, the block diagram of a wearable display equipment is provided according to an embodiment of the present invention. FIG. 4 is a perspective view of the wearable display equipment shown in FIG. 1. The wearable display equipment includes a headphone device 10, a display device 20, and a connecting component 30. The headphone device 10 includes two headphone bodies 11 defining an axis direction Y through the two headphone bodies 11. The display device 20 includes a housing 21 and an optical display module 22 within the housing 21. The housing 21 includes two end regions 211 adjacent to the two headphone bodies 11 respectively, a middle region 212 between the two end regions 211, and a connecting portion 213 disposed in the middle region 212. The connecting component 30 includes a main body 31 and two distal ends 32 extending from two opposite sides of the main body 31 respectively. The two distal ends 32 are respectively connected to the two headphone bodies 11. The main body 31 is at least partially connected to the connecting portion 213. The connecting component 30 can incur elastic deformation to change a distance between the two distal ends 32, so as to make the two headphone bodies 11 respectively connected to the two distal ends 32 approaching or departing from each other.

The present invention provides an embodiment in which the display device 20 of the wearable display equipment is connected to the headphone device 10 via the connecting component 30, and the connecting portion 213 of the display device 20 is disposed in the middle region 212 of the housing 21, i.e., the two ends along the axis direction Y of a side of the display device 20 adjacent to the two headphone bodies 11 are detachable from the connecting component 30. In the embodiment, the two ends of the display device 20 correspond to the two end regions 211. In the other embodiments, according to the different connecting manners between the connecting portion 213 and the connecting component 30, the middle region 212 could have a portion of unfixed region, and the two ends of the display device 20 further include the unfixed region of the middle region 212. When a user wears the wearable display equipment 1 and exerts force to separate the two headphone bodies 11 from each other, the two end regions 211 of the display device 20 are not connected to the connecting component 30. Thus, the portions of the connecting component 30 corresponding to the two end regions 211 further provide deformation space for the headphone bodies 11 to separate from each other.

The display device 20 is fixed to the connecting component 30 and projects image towards the direction of the two headphone bodies 11. In details, the housing 21 of the wearable display equipment includes a front-side display 21A having watching windows 216, and an exterior of the housing 21B opposite to the front-side display 21A. The watching window 216 is adapted for displaying the image content of the optical display module 22 within the housing 21. The connecting portion 213 is disposed in a middle region 212B of the exterior of the housing 21B that is remote from the two headphone bodies 11. In the embodiment, the display device 20 includes two sets of the optical display module 22, for providing two eyes of the user to watch the content of display respectively. In details, each set of the optical display modules 22 includes a set of micro display devices and optical modules (not shown), image produced by the micro display device is projected from the watching windows 216 to the left eye and the right eye of the user through the corresponding optical modules along a predetermined direction. Thus, the user can see the magnified virtual image of the display content of the micro display device. In the other embodiments, the optical display module could include a set of micro display devices as a single display source, project to the left eye and the right eye of the user respectively through two sets of the optical modules along its own projecting direction.

Figure 2:
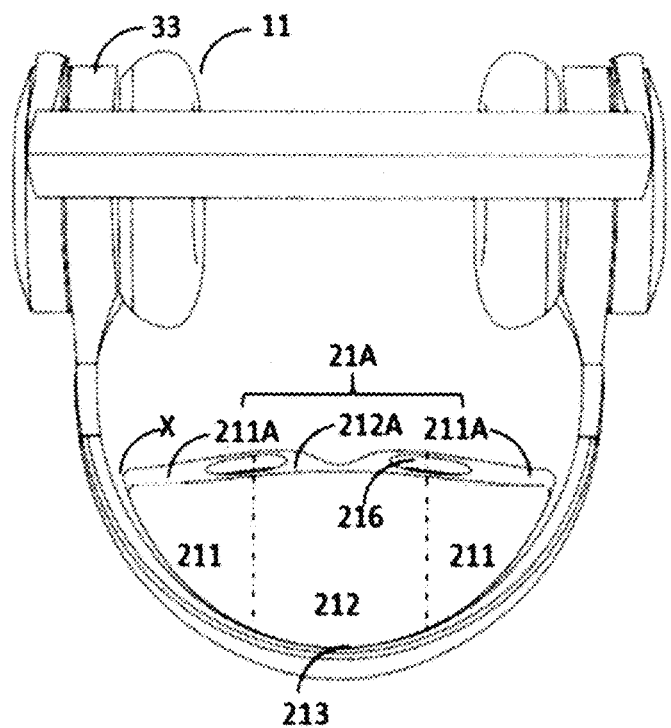
FIG. 2 is a top, block diagram view of the wearable display equipment in an expanded state in accordance with the embodiment of the present invention.

In the embodiment, the housing 21 further includes a housing topside 21C and a housing bottom-side (not shown), to build a sealed housing space, the two end regions 211 include two end regions 211A of the front-side display 21A adjacent to the two headphone bodies respectively, two end regions 211B of the exterior of the housing 21B adjacent to the two headphone bodies respectively, two end regions 211C of the housing topside 21C adjacent to the two headphone bodies respectively, and two end regions (not shown) of the housing bottom-side (not shown) adjacent to the two headphone bodies respectively. The middle region 212 includes a middle region 212A of the front-side display 21A, a middle region 212B of the exterior of the housing 21B, a middle region 212C of the housing topside 21C, and a middle region of the housing bottom-side. In details, the connecting component 30 covers the exterior of the housing 21B, the connecting portion 213 is disposed at the middle region 212B of the exterior of the housing 21B, and the two end regions 211B of the exterior of the housing 21B are not connected to the connecting component 30, so as to make the connecting component 30 made of the elastic materials having larger deformable region. The connecting portion 213 can be connected to the connecting component 30 in a manner selected from the group consisting of pasting, riveting, snap-fit structure, magnetic adsorption, pivoting junction and so on or combination of the above manners, because the above connecting manners are well known to the ordinary skilled person in the art, no more expatiation here. As shown in FIG. 1, in a natural state, i.e., without force exerted on the wearable display equipment, the connecting component 30 is in an original state. In the embodiment, in the original state the connecting component 30 is attached to the middle region 212B and the two end regions 211B of the exterior of the housing 21B. When a force is exerted to separate the two headphone bodies 11 from each other, as shown in FIG. 2, the portions of the connecting component 30 corresponding to the two end regions 211B in the original state are changed to depart from the two end regions 211B in an expanded state. In the embodiment, in the expanded state there is a certain predefined space X between the connecting component 30 and the side of the two end regions 211 adjacent to the headphone bodies 11, to provide an elastic space to separate the headphone bodies 11 from each other, so as to accommodate users having different width of face. The connecting component 30 is made of deformable elastic materials, it can provide a clamping force to make the two headphone bodies 11 approach each other when the user wears, to stabilize the state of wearing.

It could be understood that, in the other embodiments, the wearable display equipment is in the natural state, there is a certain predefined space between the connecting component 30 and the housing 21 including the side of the two end regions 211 where the connecting portion 213 is located, that is, non-attaching disposed. Additionally, it must be noted that, the partition and the proportion of the middle region 212 and the two end regions 211 are not limited to what is shown in FIG. 2 and FIG. 3. Two opposite ends of the display device 20 adjacent to the two headphone bodies 11 respectively are just not fixedly connected to the connecting component 30, compared with the state in which the connecting component 30 is fixedly connected, the connecting component 30 has a larger deformable space.

Preferably, the wearable display equipment further includes a head mounted bracket 40 connected to the two headphone bodies 11, which combines with the headphone bodies 11 to form a similar headphone. The two distal ends 32 of the connecting component 30 are rotatably connected to the corresponding headphone body 11 respectively. In details, the two distal ends 32 of the connecting component 30 each includes a rotating ring 33, each is connected to the corresponding headphone body 11, the rotating ring 33 and the headphone body 11 can correspondingly set up a meshing rotational tooth structure or a hinged structure to achieve rotation connection. Thus the headphone is rotatable relative to the display device 20 via the connecting component 30. When it is rotated approximately 90 degree, i.e. the headphone is worn correctly, the display device 20 is positioned in front of the eyes of the user, and what the two eyes watch is the content of image provided by the optical display module 22 within the housing 21 through the corresponding watching window 216. In the other embodiments, when the wearable display equipment is worn correctly, an angle between the display device 20 and the head mounted bracket 40 can be flexibly disposed according to different forms of the headphone. When the headphone rotates with the display device 20 to be in a tucked state, that is the head mounted bracket 40 is tucked to the display device 20, the space volume occupied by the product decreases, it is convenient for the user to store and carry. Additionally, in the other embodiments, each distal end 32 further includes a telescopic structure, so that the user can adjust the distance between the display device 20 and the eyes of the user.

In the other embodiments, the connecting portion can be disposed in the middle region 212A of the front-side display 21A of the housing, the detailed position can be flexibly disposed according to the detailed design of the product, as long as it does not affect the viewing perspective of the user through the watching window 216 of the front-side display 21A. The connecting portion 213 can also be disposed at the middle region 212C of the housing topside 21C, the middle region of the housing bottom-side, or simultaneously disposed at the housing topside 21C and the housing bottom-side. Thus the connecting component 30 can be two connecting belts, multiple connecting portions also can be disposed at any side of the housing 21, are connected to the connecting component 30 consisting of multiple connecting belts respectively. The connecting portion 213 also can be disposed at the middle region 212 in the housing 21, thus the connecting components 30 can be disposed in the housing 21 and each extend through the lateral sides of the housing 21 correspondingly facing the headphone bodies 11. It could be understood that, the housing 21 can include multiple lateral sides according to the detailed form, the connecting portion 213 is flexibly disposed at the middle region 212 constructed by the multiple lateral sides, as long as the connecting portion 213 is not disposed at the two end regions 211 of the display device 20 adjacent to the headphone bodies 11. Thereby, the two end regions 211 of the display device 20 are in a non-connecting state, the portions of the connecting component 30 corresponding to the two end regions 211 increase the deformation space to be provided, when the user wears the wearable display equipment 2 and exerts force to separate the two headphone bodies 11 from each other, via the connecting component 30 partially connected to the display device 20 it reduces limitations that the form of the display device imposing on the connecting component 30.

The above description is only optimal implementations of the present invention, not limiting the present invention, any modification, equivalent replacement and improvement, etc., within the spirits and principles of the present invention shall be included in the claimed scope of the present invention.

What is claimed is:

1. A wearable display equipment comprising:
   a headphone device comprising two headphone bodies;
   a display device comprising a housing and an optical display module within the housing, the housing comprising two end regions respectively adjacent to the two headphone bodies, a middle region between the two end regions, and a connecting portion disposed in the middle region; and
   a connecting component comprising a main body and two distal ends respectively extended from two opposite sides of the main body, the two distal ends respectively connected to the two headphone bodies, and a part of the main body connected to the connecting portion;
   wherein the housing comprises a front side having watching windows and a rear side opposite the front side, and the main body of the connecting component is located behind the rear side of the housing.

2. The wearable display equipment as claimed in claim 1, further comprising a head mounted bracket connected to the two headphone bodies.

3. The wearable display equipment as claimed in claim 1, wherein two distal ends of the connecting component are respectively and rotatably connected to the two headphone bodies.

4. The wearable display equipment as claimed in claim 1, wherein the housing comprises a front-side display having watching windows and an exterior of the housing opposite to the front-side display, the watching windows configured for displaying image content generated by the optical display module within the housing, and the connecting portion is disposed in a middle region of the exterior of the housing.

5. The wearable display equipment as claimed in claim 4, wherein the connecting component covers the exterior of the housing.

6. The wearable display equipment as claimed in claim 1, wherein a predefined space is reserved between the connecting component and the two end regions adjacent to the headphone bodies.

7. The wearable display equipment as claimed in claim 1, wherein the connecting component is deformable for adjusting a distance between the two distal ends.

8. The wearable display equipment of claim 1, wherein when in a natural state, the main body of the connecting component contacts the two end regions of the housing, and when in a wearing state, the main body of the connecting component is spaced and does not contact the two end regions of the housing.

9. The wearable display equipment of claim 1, wherein the main body of the connecting component partially surrounds the rear side of the housing.

10. The wearable display equipment of claim 1, wherein the main body of the connecting component has a front face facing the rear side of the housing, and a gap is defined between the front face of the main body and the rear side of the housing.

11. A wearable display equipment comprising:
two headphone bodies, defining an axis direction running through the two headphone bodies;
an elastic connecting component connected to the two headphone bodies, the connecting component configured for making the two headphone bodies approach or depart from each other; and
a display device fixedly attached to the connecting component for projecting image in a direction pointing at the two headphone bodies, wherein two ends of the display device near the two headphone bodies are both separated from the connecting component along the axis direction, and wherein the display device comprises a front side having watching windows and a rear side opposite the front side, and a main body of the connecting component is located behind the rear side of the housing.

12. The wearable display equipment as claimed in claim 11, wherein the display device comprises watching windows for projecting image therethrough and an exterior of a housing opposite to the watching windows, the connecting component being connected to the exterior of the housing.

13. The wearable display equipment as claimed in claim 12, wherein the connecting component is disposed at a side of the exterior of the housing distal the two headphone bodies.

14. The wearable display equipment as claimed in claim 11, wherein a predefined space is reserved between the connecting component and the two ends of the display device adjacent to the two headphone bodies along the axis direction.

15. The wearable display equipment as claimed in claim 11, further comprising a head mounted bracket connected to the two headphone bodies.

16. The wearable display equipment as claimed in claim 11, wherein the connecting component comprises two rotating rings respectively and rotatably connected to the two headphone bodies.

* * * * *